US011250373B1

(12) United States Patent
Condron

(10) Patent No.: US 11,250,373 B1
(45) Date of Patent: Feb. 15, 2022

(54) PACKAGE LOCATION BEACON

(71) Applicant: Amazon Technologies, Inc., Seattle, WA (US)

(72) Inventor: Aaron Condron, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 16/705,041

(22) Filed: Dec. 5, 2019

(51) Int. Cl.
| | |
|---|---|
| G06Q 10/08 | (2012.01) |
| G06Q 50/28 | (2012.01) |
| H04W 4/029 | (2018.01) |
| H04W 4/02 | (2018.01) |

(52) U.S. Cl.
CPC ..... *G06Q 10/0833* (2013.01); *G06Q 10/0875* (2013.01); *G06Q 50/28* (2013.01); *H04W 4/023* (2013.01); *H04W 4/029* (2018.02)

(58) Field of Classification Search
CPC .......... G06Q 10/0833; G06Q 10/0875; G06Q 50/28; H04W 4/029; H04W 4/023
See application file for complete search history.

(56) References Cited

U.S. PATENT DOCUMENTS

| | | | | |
|---|---|---|---|---|
| 9,020,536 | B1* | 4/2015 | Crossno | G06Q 10/0833 |
| | | | | 455/456.3 |
| 9,846,854 | B1* | 12/2017 | Lee | G06Q 10/083 |
| 10,121,118 | B1* | 11/2018 | Kim | H04W 4/80 |
| 10,614,408 | B2* | 4/2020 | Lau | G06F 11/3055 |
| 10,997,545 | B1* | 5/2021 | Bhagwat | G07B 17/00 |
| 2013/0103606 | A1* | 4/2013 | Holliday | G06Q 10/0833 |
| | | | | 705/333 |
| 2015/0145650 | A1* | 5/2015 | Levan | G06Q 10/0833 |
| | | | | 340/10.1 |
| 2015/0262123 | A1* | 9/2015 | Sharma | G06Q 10/0833 |
| | | | | 705/333 |
| 2016/0096508 | A1* | 4/2016 | Oz | H04L 63/08 |
| | | | | 701/36 |
| 2016/0155084 | A1* | 6/2016 | Mandanapu | H04B 5/0062 |
| | | | | 705/333 |
| 2016/0232479 | A1* | 8/2016 | Skaaksrud | H04W 4/02 |

(Continued)

OTHER PUBLICATIONS

A. Bröring. Live and web-based parcel monitoring with low-cost sensors. In D. Vandenbroucke, B. Bucher, and J. Crompvoets, editors, Online Proceedings of the 16th AGILE International Conference on Geographic Information Science. Leuven, Belgium. May 2013. (Year: 2013).*

(Continued)

*Primary Examiner* — Nathan A Mitchell
(74) *Attorney, Agent, or Firm* — Lee & Hayes, P.C.

(57) ABSTRACT

A notification protocol of a package computing device can be initiated to assist a courier locate a package within a delivery vehicle that is for delivery at a delivery location. The package computing device can be removably attached to a package. A delivery computing device can receive an identifier associated with the package computing device from a remote computing system and determine a current location of the delivery computing device. Based on the current location being within a threshold distance of the delivery location, the delivery computing device can broadcast the identifier to cause the package computing device to initiate the notification protocol. Then, based on the notification protocol, the courier can locate the package within the delivery vehicle.

20 Claims, 10 Drawing Sheets

(56) References Cited

U.S. PATENT DOCUMENTS

| | | | | |
|---|---|---|---|---|
| 2017/0140329 | A1* | 5/2017 | Bernhardt | B65G 1/1371 |
| 2018/0053365 | A1* | 2/2018 | Bode | G06Q 10/0833 |
| 2018/0061162 | A1* | 3/2018 | High | G06Q 10/083 |
| 2018/0197139 | A1* | 7/2018 | Hill | G06Q 10/0832 |
| 2019/0034873 | A1* | 1/2019 | Boitel | G06K 9/00825 |
| 2020/0051015 | A1* | 2/2020 | Davis | G06Q 50/28 |
| 2020/0349510 | A1* | 11/2020 | Dhonde | G06K 19/06037 |
| 2021/0158290 | A1* | 5/2021 | Turk | H04W 4/029 |
| 2021/0201643 | A1* | 7/2021 | Haynes | G06Q 10/0833 |

OTHER PUBLICATIONS

A. Shamsuzzoha, R. Addo-Tenkorang, D. Phuong and P. Helo, "Logistics tracking: An implementation issue for delivery network," 2011 Proceedings of PICMET '11: Technology Management in the Energy Smart World (PICMET), 2011, pp. 1-10. (Year: 2011).*

Liu et al. E-delivery: A Shipment Tracking System Using Wireless Technology and Mobile Agents. In Proceedings of the International Conference on Parallel and Distributed Processing Techniques and Applications—vol. 4. 2002 (Year: 2002).*

C. Kandel, M. Klumpp and T. Keusgen, "GPS based track and trace for transparent and sustainable global supply chains," 2011 17th International Conference on Concurrent Enterprising, 2011, pp. 1-8. (Year: 2011).*

Hassan et al. "A Design of Packages Tracking System Based on Radio Frequency Identification," 2018 International Conference on Computer, Control, Electrical, and Electronics Engineering (ICC-CEEE), 2018, pp. 1-6. (Year: 2018).*

* cited by examiner

PACKAGE LOCATION BEACON

BACKGROUND

A user can order an item and expect a delivery of a package containing the item to a delivery address associated with the user. A courier can use a delivery vehicle to deliver the package to delivery address. In some instances, the courier can arrive at the delivery location and have difficulty finding the package that is associated with the delivery location within the delivery vehicle. This can result in a disappointing and/or frustrating experience for the courier and, in some instances, cause a delay in the delivery of the package and/or other packages.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
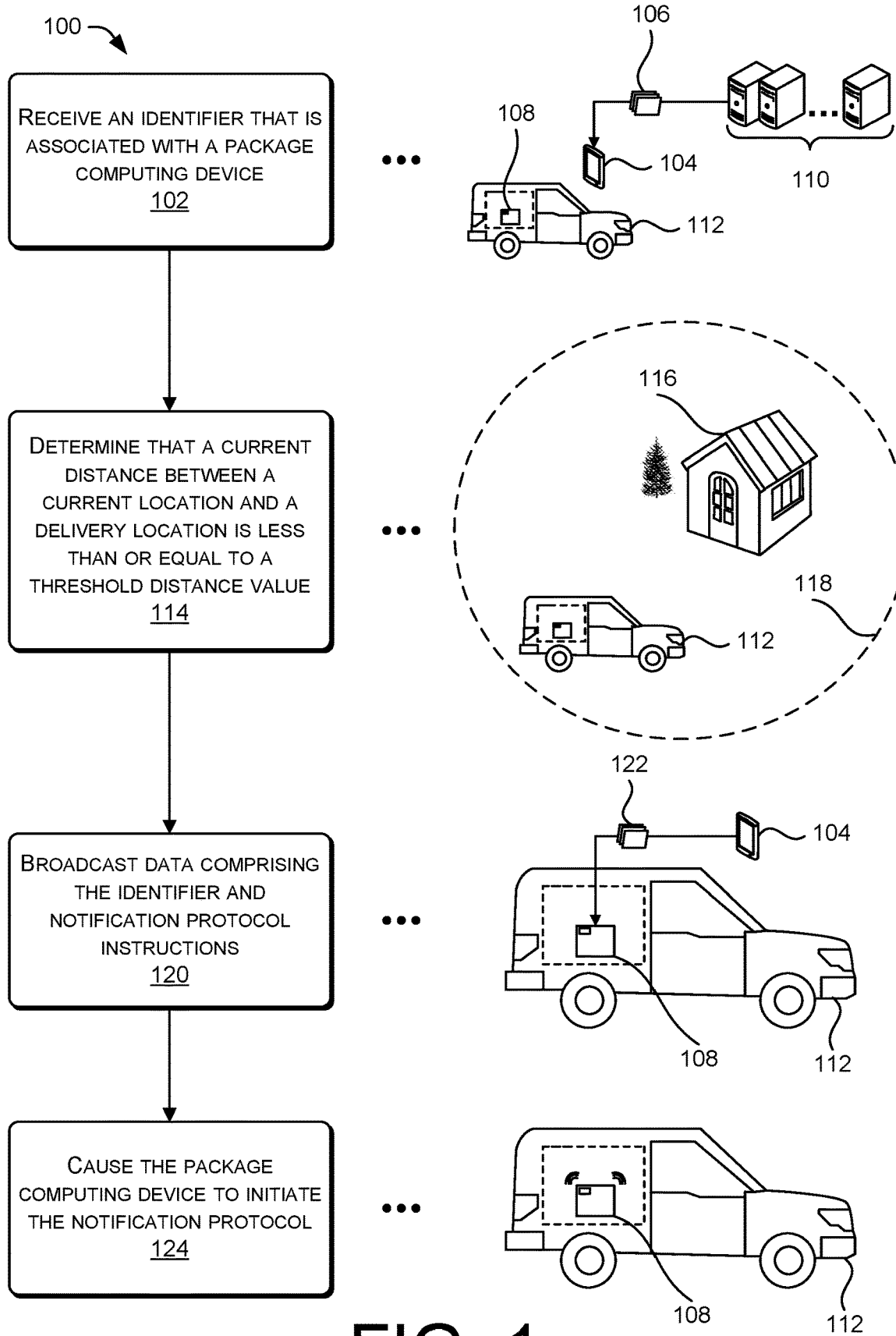
FIG. 1 is a pictorial flow diagram of an example process for initiating a notification protocol of a package computing device.

A user can order an item from, for example, an Internet-based retailer. The item can be delivered as a package to a delivery location (e.g., a delivery address) provided by the user and/or associated with the user. The package can be delivered to the delivery location by a courier. In some instances, the courier can use a delivery vehicle (e.g., a truck, a van, a car, etc.) that contains the package. A delivery computing device used by the courier (e.g., a mobile telephone, a tablet computing device, a scanner device, etc.) can determine that a current location of the delivery computing device is within a threshold distance of the delivery location. In some instances, the delivery computing device can determine a status of the delivery vehicle (e.g., shifted from a drive position of the transmission of the delivery vehicle to a park position of the transmission, turned the ignition off, etc.) and, based on the current location and/or the status of the delivery vehicle, broadcast data. The data can include an identifier and instructions, where the identifier is associated with a package computing device that is removably attached or coupled to the package and the instructions instruct the package computing device to initiate a notification protocol. The notification protocol may cause illumination of lights of the package computing device, activation of a vibration component of the package computing device, output of sound via one or more speakers of the package computing device, and so on. The notification protocol can allow the courier to locate the package within the delivery vehicle for delivery of the package to the delivery location.

When a user completes an order of an item, order data can be transmitted to a remote computing system. The order data can indicate, among other information, the item ordered, a cost of the item, a delivery location, and/or a delivery preference associated with the order and/or the user. In some instances, the user can have a default delivery preference. For example, a user can specify the default delivery preference of the user in a user account management user interface, where the default delivery preference may be stored in association with a user account or user profile of the user. In some instances, the user can indicate the delivery preference in an order user interface when placing the order of the item.

A processing center (e.g., a sortation center, a distribution center, a fulfillment center, etc.) can process the order and sort packages for delivery. For example, orders can be processed and fulfilled by a retailer, an e-commerce merchant, a distributor, a supplier, or another provider. Personnel (e.g., individuals, robots, mechanical arms, etc.) can locate or pick an item by pulling the item off a shelf, out of a bin, etc. The item can then travel, whether by a conveyor system, a robot, and/or by personnel, to a packaging station where the items are packaged into packages (e.g., boxes, bags, envelopes, etc.). In some instances, portions of this process may be performed by automated machines (e.g., robots) that locate the item, pick the item, and/or package the item. After packaging, the package can move through multiple follow-on processes at the same facility, or at additional facilities. In some instances, the order can be processed and fulfilled at a location or environment separate from the processing center and then transported or otherwise delivered to the processing center. However, in some instances, the orders can be processed, fulfilled, and sorted within the same environment, or different locations within the same environment.

As discussed above, the package containing the item can be a box, a bag, an envelope, etc. A package computing device can be removably attached to the package and can be associated with an identifier. In some instances, the package computing device can be housed within a rigid or semi-rigid case (e.g., a plastic case, a metal case, a rubber case, a silicon case, etc.) that includes a notification mechanism (e.g., a light, a speaker, a vibration motor, and the like). The notification mechanism can alert personal such as a courier of a location of the package, which is discussed in further detail below.

In some instances, the package computing device can be placed within a transparent (or translucent) packing slip pouch such as a plastic pouch that is adhered to a side of the package. At time of delivery, the courier can open the plastic pouch and remove the package computing device for reuse. In some instances, the package computing device can be affixed to a portion of the package that is surrounded by a perforation that can be detached from the package. Similarly, as described above, the courier, at time of delivery, can remove the portion of the package that is affixed to the package computing device. In some instances, the package computing device can be affixed to a strap (e.g., a nylon braided or woven strap) that can be attached to the package using a fastener such as a hook-and-loop fastener, a button mechanism, a belt buckle mechanism, and the like. At time of delivery, the courier can unfasten the strap to detach the package computing device from the package. In some instances, the package computing device can be placed within the package. In some instances, the package computing device can comprise printable materials and printed onto a package using techniques such as three-dimensional printing and/or silk screening techniques to print components such as a battery and/or a light-emitting diode.

During the processing of the order, a portion of the order data can be associated with the package. By way of example and without limitation, a shipping label can be affixed to the package that includes a return address, a shipping address, a name of a recipient, an order number, etc. Additionally, a processing system can determine an identifier associated with the package computing device. The package computing device identifier can be an identifier such as a universally unique identifier (UUID) that can be used to identify the package computing device, although other types of identifiers are contemplated such as a media access control (MAC) address and/or other generated values/identifiers based on random number generating algorithms (e.g., a pseudorandom number generator) and/or other number generating algorithms. By way of example and without limitation, the processing system can scan a code such as a Quick Response (QR) code, a Universal Product Code (UPC), and the like. In some instances, the processing system can use radio-frequency identification (RFID) to determine the identifier of the package computing device. Then, the processing system can associate the identifier with the order.

A courier can be assigned to deliver the package to the delivery location. In some instances, the courier can be an individual operating a delivery vehicle such as a car, a truck, a bicycle and/or the courier can deliver the package on foot. In some instances, the courier can be an autonomous vehicle such as an autonomous car, an autonomous truck, an autonomous aerial vehicle, an unmanned aerial vehicle (UAV), and/or a robot (e.g., an autonomous robot or a robot controlled by an individual). In some instances, the delivery computing device can assist the courier by, for example, providing directions to the delivery location. In some instances, the delivery computing device can be the courier (e.g., as an autonomous vehicle, an autonomous aerial vehicle, a UAV and/or a robot).

The courier can receive the package for delivery (e.g., the package can be loaded into the delivery vehicle) and the delivery computing device can receive the identifier of the package computing device that is associated with the package. In instances where the courier can deliver the package on foot or on a bicycle, the courier can carry the package in a bag such as a backpack. In instances where the courier is an autonomous vehicle, the autonomous vehicle can include a cargo area to store the package.

In some instances, the delivery computing device can also receive, from a remote computing system such as the processing system, the delivery location and, in some instances, determine a route for the delivery vehicle to follow to deliver the package. As the courier approaches the delivery location, the delivery computing device can determine a location of the delivery computing device using global positioning system (GPS) data although other types of data are contemplated such as cellular network data (e.g., 2G, 3G, 4G, 5G, GSM, CDMA, UMTS, LTE, etc.), Wi-Fi network data, and/or sensor data (e.g., image data, RADAR data, SONAR data, LIDAR data, etc.). The delivery location can be associated with a geographic region (e.g., a geo-fence or a threshold distance surrounding the delivery location) and the delivery computing device can determine when the delivery computing device has entered the geographic region or is within a threshold distance of the delivery location. For example, the delivery computing device can access map data and compare the current location of the delivery computing device with the map data and the geographic region to determine whether the delivery computing device has entered the geographic region. In some instances, the delivery computing device can store the map data within a memory of the delivery computing device. In some instances, the delivery computing device can access the map data using a wireless network such as a cellular network.

In some instances, the delivery computing device may not have connectivity to the remote computing system and can include the data such as the identifier, the delivery location, and/or the map data prior to departing from the processing center. In some instances, the delivery computing device can have connectivity with the remote computing system and receive data such as the identifier, the delivery location, and/or map data as the delivery of the package is in progress.

Then, the delivery computing device can determine a status of the delivery vehicle indicating that the courier is prepared to deliver the package to the delivery location. By way of example and without limitation, the status can indicate that the courier operating the delivery vehicle has turned off an ignition of the delivery vehicle. In some instances, the status can indicate that the courier has shifted the transmission into a "park" position. In some instances, the status can indicate that a velocity of the delivery vehicle and/or the delivery computing device is traveling at a velocity that is below a threshold velocity value and/or that the velocity has been below the threshold velocity value for a threshold amount of time. In instances where the courier can deliver the package on foot or on a bicycle, the courier can input into the delivery computing device that the courier is prepared to deliver the package to the delivery location. In instances where the courier is an autonomous vehicle, the autonomous vehicle can determine, based for example a location of the autonomous vehicle, that the autonomous vehicle is prepared to deliver the package to the delivery location where the autonomous vehicle comprises the delivery computing device.

Based at least in part on the determining that the delivery computing device is within the threshold distance of the delivery location and that the courier is prepared to deliver the package, the delivery computing device can broadcast data that includes the identifier and instructions to initiate a notification protocol. The delivery computing device can broadcast the data using wireless connectivity such as Wi-Fi and/or Bluetooth connectivity, although other types of wireless communications are contemplated such as RFID, cellular, or satellite connectivity. The package computing device can receive the data and initiate the notification protocol, which can include activating a light, activating a speaker, and/or activating a vibration motor.

By way of example and without limitation, the notification protocol can assist a courier locate the package within the delivery vehicle and allow a courier to more efficiently deliver package(s) to delivery location(s). In instances where the courier is an autonomous vehicle such as an autonomous truck, the notification protocol can assist robotic systems within the autonomous truck to locate the package for delivery.

In some instances, the package computing device can include an input mechanism such as a button to indicate that the courier has located the package and to disable the notification protocol.

The user accounts and data associated with the user accounts (e.g., purchase data, activity data, etc.) can be anonymized by generating anonymous identifiers corresponding to the user accounts. Specific characteristics of the orders and purchases as well as activity, such as the time of the interactions, the categories of items being interacted with, the sources of the items, and the like, can be discarded. Some activity, such as those corresponding to potentially embarrassing or sensitive shopping behavior, can be discarded. Undiscarded data can be packaged into entries that include anonymous identifiers corresponding to the user accounts and the characteristics of the interaction. In some instances, prior to collecting information relating to a user and a user's interaction with items, the user may opt in and/or approve of such collection of data.

FIG. 1 is a pictorial flow diagram of an example process 100 for causing a package computing device to initiate a notification protocol. Some portions of example process 100 can be omitted, replaced, and/or reordered while still providing the functionality of causing the package computing device to initiate a notification protocol.

At operation 102, a delivery computing device 104 can receive data 106 that includes an identifier of a package computing device that is associated with a package 108 from a remote computing system 110. The remote computing system 110 can be a processing system that can receives an order from a user, determine the package 108 that contains an item associated with the order, and/or determine an identifier of the package computing device that is associated with the package 108. In some instances, the remote computing system 110 can determine the delivery vehicle 112 that is associated with the courier assigned to deliver the package 108 to the delivery location.

In some instances, the delivery computing device 104 can be a mobile device similar to a cellphone or other devices such as a tablet computer, a laptop computer, a smartwatch, and/or a different wearable device. In some instances, the delivery computing device 104 can be a computing system that is a component of the delivery vehicle 112. For example, the delivery computing device 104 can be a computing system that is in a dash of the delivery vehicle 112 or a component within an autonomous vehicle.

In some instances, the data 106 can include a delivery address associated with the package 108, a route to guide the courier and/or delivery vehicle 112, and/or map data of an environment. The delivery computing device 104 can use the delivery address to compute a delivery route to a delivery location of the package 108. In some instances, the delivery computing device 104 can receive a delivery route for an operator (e.g., the courier) of the delivery vehicle 112 to follow. In some instances, the delivery computing device 104 can receive map data which can allow the delivery computing device to continue to determine a delivery route (and/or an updated delivery route if the delivery vehicle is redirected) without requiring data access.

At operation 114, the delivery computing device 104 can determine that a current distance between a current location of the delivery computing device 104 and a delivery location is less than or equal to a threshold distance value. As discussed above, the courier can use the delivery computing device 104 to provide directions to the delivery location 116. In some instances, the delivery computing device 104 can determine location data indicating a current location of the delivery computing device (using, for example, a GPS sensor, cellular networks, signal strength data, etc.), that the delivery computing device 104 has entered a geographic region 118 defined by a threshold distance that surrounds the delivery location 116. The delivery location 116 may correspond to a physical address at which the package 108 is to be delivered. The threshold distance value may be any distance (e.g., 50 feet, 100 feet, 2 blocks, ¼ mile, etc.) and may indicate that the courier that is transporting the package 108 (and possibly other packages) is in proximity to the delivery location 116.

At operation 120, the delivery computing device 104 can broadcast data 122 comprising the identifier and notification protocol instructions. For example, the delivery computing device 104 can determine that, based on the current location of the delivery computing device 104, that the courier will be preparing to deliver the package 108 to the delivery location 116 and broadcast the data 122. In some instances, the delivery computing device can broadcast the data 122 based on a status of the delivery vehicle 112. By way of example and without limitation, the delivery computing device 104 can receive a signal from the delivery vehicle 112 indicating that the status of the vehicle is a parked status. The courier can shift the transmission into a park position and that can cause a signal to be sent to the delivery computing device 104 indicating the parked status of the delivery vehicle 112. In some embodiments, the courier may input, via the delivery computing device 104, data (e.g., via a user interface, a voice command, etc.) indicating that the courier is currently parked. In some instances, the delivery vehicle 112 can transmit the status to the delivery computing device 104 wirelessly. In some instances, the delivery vehicle 112 can transmit the status to the delivery computing device 104 through a physical connection (e.g., a dock on a dash of the delivery vehicle 112 where the delivery computing device 104 can be positioned in). In some instances, the delivery computing device 104 can be a component of the delivery vehicle 112 such as a component in a dash of the delivery vehicle 112.

At operation 124, the data 122 can cause the package computing device to initiate the notification protocol. As discussed above, the package computing device can include a light, a speaker, and/or a vibration motor. In response to receiving the data 122, the package computing device can initiate the notification protocol, which can include activating a light (or a light pattern), activating a sound (or a sound pattern), and/or activating a vibration motor. In some instances, the package computing device can receive the data 122 using wireless communications such as Wi-Fi, Bluetooth, cellular networks, RFID, and the like. In some instances, the package computing device can be configured to receive the data 122 from the delivery computing device 104. In some instances, the package computing device can be configured to receive the data 122 from the processing system (e.g., a remote computing system). In some instances, the package computing device can receive the data 122 from both the delivery computing device 104 and the processing system where the delivery computing device 104 and/or the processing system can serve as a redundant system to communicate with the package computing device.

The notification protocol can allow the courier to more easily locate the package 108 within the delivery vehicle 112. For instances, if the delivery vehicle is a van or truck that is transmitting hundreds of packages, the package computing device emitting a light, sound, vibration, etc., may allow the courier to quickly identify the package 108 for delivery. In some instances, the courier can deliver the package 108 on foot or on a bicycle, the notification protocol can allow the courier to more easily locate the package 108 within a container such as a bag or a backpack. By allowing the courier to more quickly identify the package 108 that is associated with the delivery location 116, the latency between arriving at the delivery location 116 and delivering the package 108 can be reduced. Additionally, by reducing the latency, a courier can gain efficiency and deliver more packages to more delivery location within a period of time compared to delivering packages without the notification protocol.

In some instances, the delivery computing device 104 can communicate with the package computing device to verify a payload of the delivery vehicle 112. By way of example and without limitation, the delivery vehicle 112 can be loaded with the package 108 and prior to the delivery vehicle 112 departing a processing center (e.g., a sortation center, a distribution center, a fulfillment center, etc.), the remote computing system 110 can transmit data to the delivery computing device 104 that includes a delivery manifest that includes one or more identifiers associated with one or more packages that are loaded onto the delivery vehicle 112. The delivery computing device 104 can broadcast data where one or more package computing devices associated with the one or more packages that are within a communication range of the delivery computing device 104 respond to the delivery computing device 104 with their respective identifiers. The delivery computing device 104 can compare the response of the one or more package computing devices with the data from the remote computing system 110 to determine whether the delivery vehicle 112 is loaded with the correct packages (e.g., packages intended for a delivery route of the delivery vehicle 112 or a verified payload).

In some instances, the delivery vehicle 112 can be loaded with a package that is not associated with a delivery route of the delivery vehicle 112 and the extraneous package (e.g., an unverified payload) can be removed from the delivery vehicle 112. In some instances, the delivery vehicle 112 can be missing a package that is associated with the delivery route of the delivery vehicle 112. In some instances, in response to identifying a missing package, the remote computing system 110 can transmit data to other delivery computing devices at the processing center and/or to other delivery computing devices that are currently in the process of a delivery that includes the identifier associated with the package computing device of the missing package and instructions to initiate a notification protocol. Then a different courier associated with a different delivery computing device can transmit an indication back to the remote computing system 110 that the different courier has located the missing package. This can allow the remote computing system 110 to locate a position of the missing package.

By way of example and without limitation, a user can place an order for an item to be delivered to a delivery location. The order can be received at a processing system such as a remote computing system. Then, the processing system can identify a package to for packaging the item for delivery. For example, the processing system can identify a larger package for a larger item and can identify a smaller package for a smaller item. The package can be associated with a package computing device. For example, the package computing device can be removably coupled to the package, can be placed inside the package, and/or can be printed onto the package.

After the item is packaged within the package, the processing system can determine an identifier associated with the package computing device. For example, the processing system can scan a QR code, a UPC code, use RFID, and/or other suitable wireless communications such as Wi-Fi, cellular networks, Bluetooth, etc. to determine the identifier associated with the package computing device.

Then, the processing system can identify a delivery vehicle that is associated with the delivery of the package to the delivery location that is associated with the user. In some instances, a delivery computing device can be a component of the delivery vehicle. In some instances, the delivery computing device can be a mobile device that is associated with a courier that is assigned to deliver the package to the delivery location. A processing center, such as a sortation center, a distribution center, and/or a fulfillment center) can use one or more personnel, conveyors, robots, etc. to load the package onto the delivery vehicle associated with the delivery of the package.

In some instances, the processing system can transmit data to the delivery computing device using wireless communications such as Wi-Fi, Bluetooth, and/or cellular networks, etc. The data can include instructions instructing the delivery computing device to determine one or more package computing devices within a communication range of the delivery computing device. The delivery computing device can broadcast instructions and receive responses from the one or more package computing devices within the communication range of the delivery computing device. Then, the delivery computing device can transmit back to the processing system the responses. By comparing the responses with the order data, the packages, the delivery vehicles, etc., the processing system can determine whether the delivery vehicle has a correct payload and contains the package(s) associated with a delivery route of the delivery vehicle prior to the delivery vehicle leaving the processing center.

In some instances, the processing system can transmit route data to the delivery computing device. For example, the processing system can transmit the delivery location of the package, a delivery route for the delivery vehicle to follow, and/or map data that includes a map of a region of an environment that includes the delivery location. By transmitting the map data, the delivery computing device can continue to determine a delivery route (and/or an updated delivery route if the delivery vehicle is redirected) without requiring data access.

As the delivery vehicle approaches the delivery location, the delivery computing device can determine a location of the delivery computing device. Based on a set of preconditions, the delivery computing device can broadcast data comprising the identifier and instructions to initiate a notification protocol. The preconditions can include the delivery computing device being within a threshold distance of the delivery vehicle, which can indicate that the courier is approaching the delivery location. Another precondition can include a status of the delivery vehicle. For example, the vehicle traveling at a velocity below a velocity threshold and/or traveling at a velocity below a velocity threshold for a threshold amount of time can indicate that the courier is preparing to perform a delivery. In some instances, the delivery vehicle shifting into a "park" mode (e.g., shifting the transmission into park") can indicate that the courier is preparing to perform a delivery. In some instances, engaging a parking brake of the delivery vehicle can indicate that the courier is preparing to perform a delivery. In some instances, turning off an ignition of the delivery vehicle (e.g., an ignition-off status) can indicate that the courier is preparing to perform a delivery. In some instances, an individual or a combination of preconditions can be required for the delivery computing device to broadcast the data comprising the identifier and the instructions to initiate the notification protocol.

In some instances, the processing system can track the location of the delivery vehicle and/or the status of the delivery vehicle. For example, the delivery vehicle can include the delivery computing device and transmit location data and status data to the processing system using wireless communications. The processing system can determine whether the preconditions are met and transmit data to the delivery vehicle to instruct the delivery vehicle to broadcast the data comprising the identifier and the instructions to initiate the notification protocol.

The package computing device can be in a cargo portion of the delivery vehicle and receive the broadcast data. The package computing device can compare the identifier included in the broadcast data and determine that the identifier matches the identifier of the package computing device. Then, the package computing device can, based on the instructions, initiate the notification protocol. In some instances, the instructions can cause the package computing device to activate a light, output audio, and/or activate a vibration motor of the package computing device. As the notification protocol executes, the courier can more easily locate the package within the cargo portion of the delivery vehicle. In some instances, the package computing device can include an input mechanism such as a button that can terminate the notification protocol. In some instances, terminating the notification protocol can cause the package computing device to transmit, to the delivery computing device and/or the processing system, response data indicating that the notification protocol has been disabled and/or terminated. Then the courier can select the correct package that is associated with the delivery location for delivery of the package.

FIGS. 2A-2F illustrate various embodiments of a package computing device that is removably attached to a package.

Figure 2A:
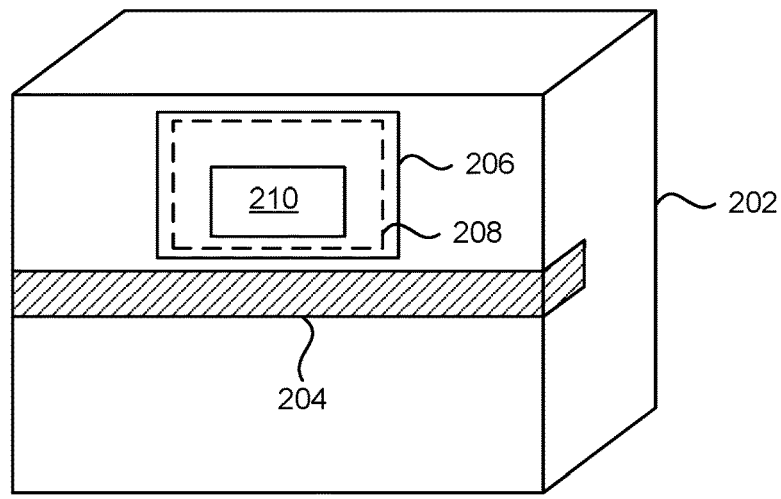
FIG. 2A depicts an isometric view of an example package and an example package computing device removably attached to the example package using an adhesive.

FIG. 2A depicts an isometric view 200 of an example package and an example package computing device removably attached to the example package using an adhesive. A package 202 can have an opening that is sealed using, for example, packaging tape 204. A pouch 206 can be formed using, for example, plastic that is adhered to the package 202 using an adhesive 208 that can allow a package computing device 210 to move freely within the pouch 206. In some instances, the pouch can be formed using paper, nylon, polyester, and/or other suitable materials such as polymers. In some instances, the pouch 206 can be formed using other attachment mechanisms such as hook-and-loop fasteners, zippers, buttons, magnets, and the like. In some instances, the pouch 206 can be similar to a packing slip pouch that can be used to contain a shipping manifest associated with the package 202.

Figure 2B:
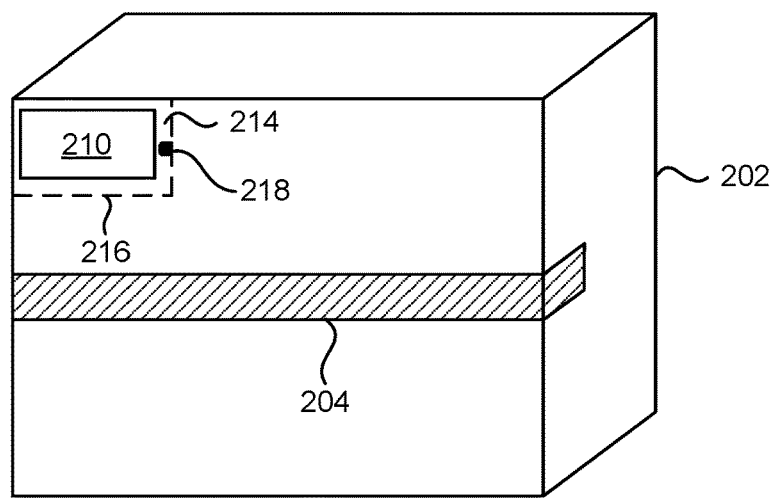
FIG. 2B depicts an isometric view of an example package and an example package computing device removably attached to the example package using a perforated portion of the example package having an aperture.

FIG. 2B depicts an isometric view 212 of an example package and an example package computing device removably attached to the example package using a perforated portion of the example package having an aperture. The package computing device 210 can be attached to a portion 214 of the package 202. In some instances, the package computing device 210 can be attached to the portion 214 using an adhesive. In some instances, the package computing device 210 can be attached to the portion 214 using other attachment mechanisms discussed above (e.g., hook-and-loop fasteners, magnets, and the like). In some instances, the package computing device 210 can be attached by fitting the package computing device 210 within a cutout of the portion 214. By way of example and without limitation, the portion 214 can include a cutout that is sized to a size that is similar to the dimensions of the package computing device 210 such that the package computing device 210 can remain within the portion 214 via friction between the package computing device 210 and the portion 214. In some instances, the portion 214 can be surrounded by a perforation 216 which can allow a courier to remove the portion 214 and the package computing device 210 from the package 202 without significantly damaging other parts of the package 202. In some instances, the portion 214 can include an aperture 218 that can allow a courier to insert a digit into the aperture 218 and tear the portion 214 from the package 202.

Figure 2C:
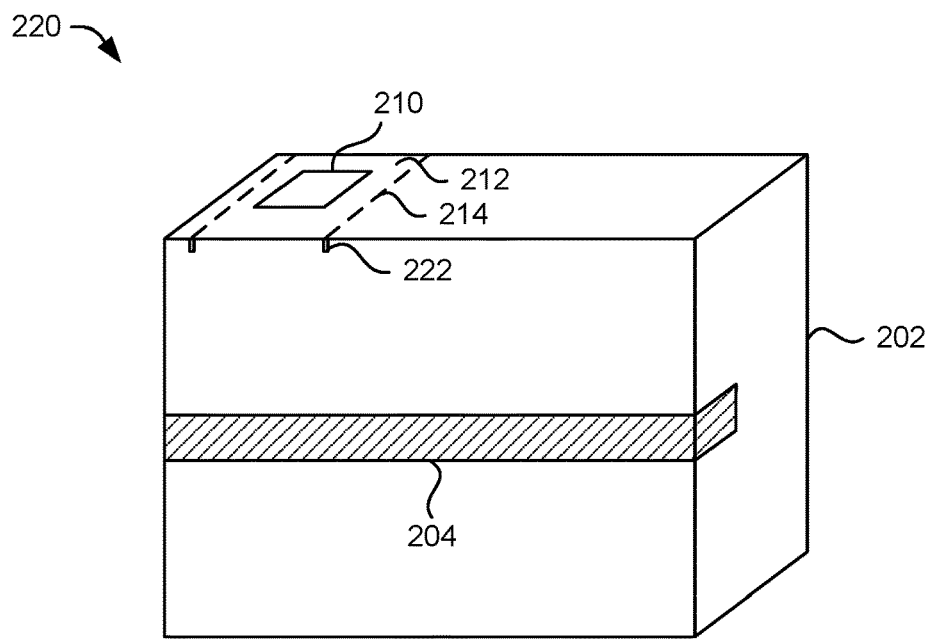
FIG. 2C depicts an isometric view of an example package and an example package computing device removably attached to the example package using a perforated portion of the example package having one or more pull tabs.

FIG. 2C depicts an isometric view 220 of an example package and an example package computing device removably attached to the example package using a perforated portion of the example package having one or more pull tabs. As illustrated in FIG. 2C, the package computing device 210 can be attached to a portion 214 as similarly described with respect to FIG. 2B. The package 202 can include pull tabs 222 which can allow a courier to tear and remove the portion 214 along the perforation 216 and the package computing device 210 from the package 202.

Figure 2D:
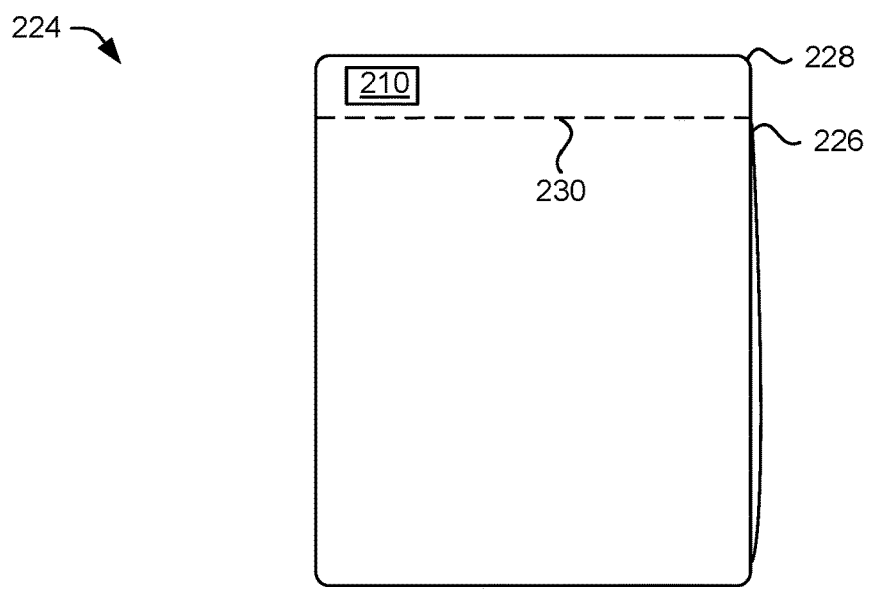
FIG. 2D depicts an isometric view of an example package (e.g., an envelope) and an example package computing device removably attached to the example package using a perforated portion of the example package.

FIG. 2D depicts an isometric view 224 of an example package (e.g., an envelope) and an example package computing device removably attached to the example package using a perforated portion of the example package. A package 226 can include a cavity within the package 226 that can store an item ordered by a user. The package 226 can be constructed out of materials such as plastics, paper, nylon, polyester, and/or other suitable materials. The package 226 can be coupled to a tearable portion 228 via a perforation 230. In some instances, the package computing device 210 can be affixed to the tearable portion 228 using an adhesive. In some instances, the tearable portion 228 can also include a cavity that contains the package computing device 210. For example, the tearable portion 228 can be constructed out of materials such as plastics that can be transparent (or translucent). A courier can tear off the tearable portion 228 along the perforation 230 to remove package computing device 210 from the package 226.

Figure 2E:
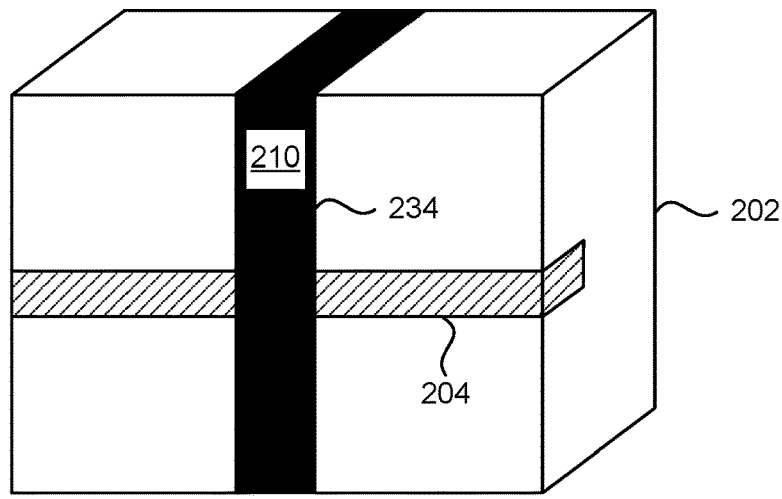
FIG. 2E depicts an isometric view of an example package and an example package computing device removably attached to the example package using a band that surrounds the example package along a single plane.

FIG. 2E depicts an isometric view 232 of an example package and an example package computing device removably attached to the example package using a band that surrounds the example package along a single plane. The package computing device 210 can be attached to a band 234 (e.g., a nylon braided or woven strap) and the band 234 can be attached to the package 202 using a fastener such as a hook-and-loop fastener, a button mechanism, a belt-buckle mechanism, and the like. This can allow for the package computing device 210 to be removed without destroying a portion of the package 202 while preserving the reusability of the package computing device 210 and the band 234.

Figure 2F:
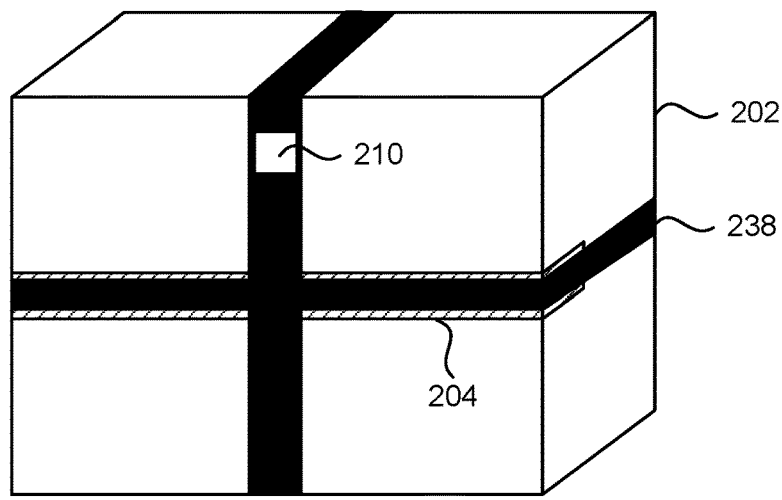
FIG. 2F depicts an isometric view of an example package and an example package computing device removably attached to the example package using a band that surrounds the example package along multiple planes.

FIG. 2F depicts an isometric view 236 of an example package and an example package computing device removably attached to the example package using a band that surrounds the example package along multiple planes. Similar to FIG. 2E, FIG. 2F depicts the package computing device 210 attached to the package 202 using a band 238 that attaches to the package 202 using an additional band that orthogonally attaches to the package 202.

Figure 3:
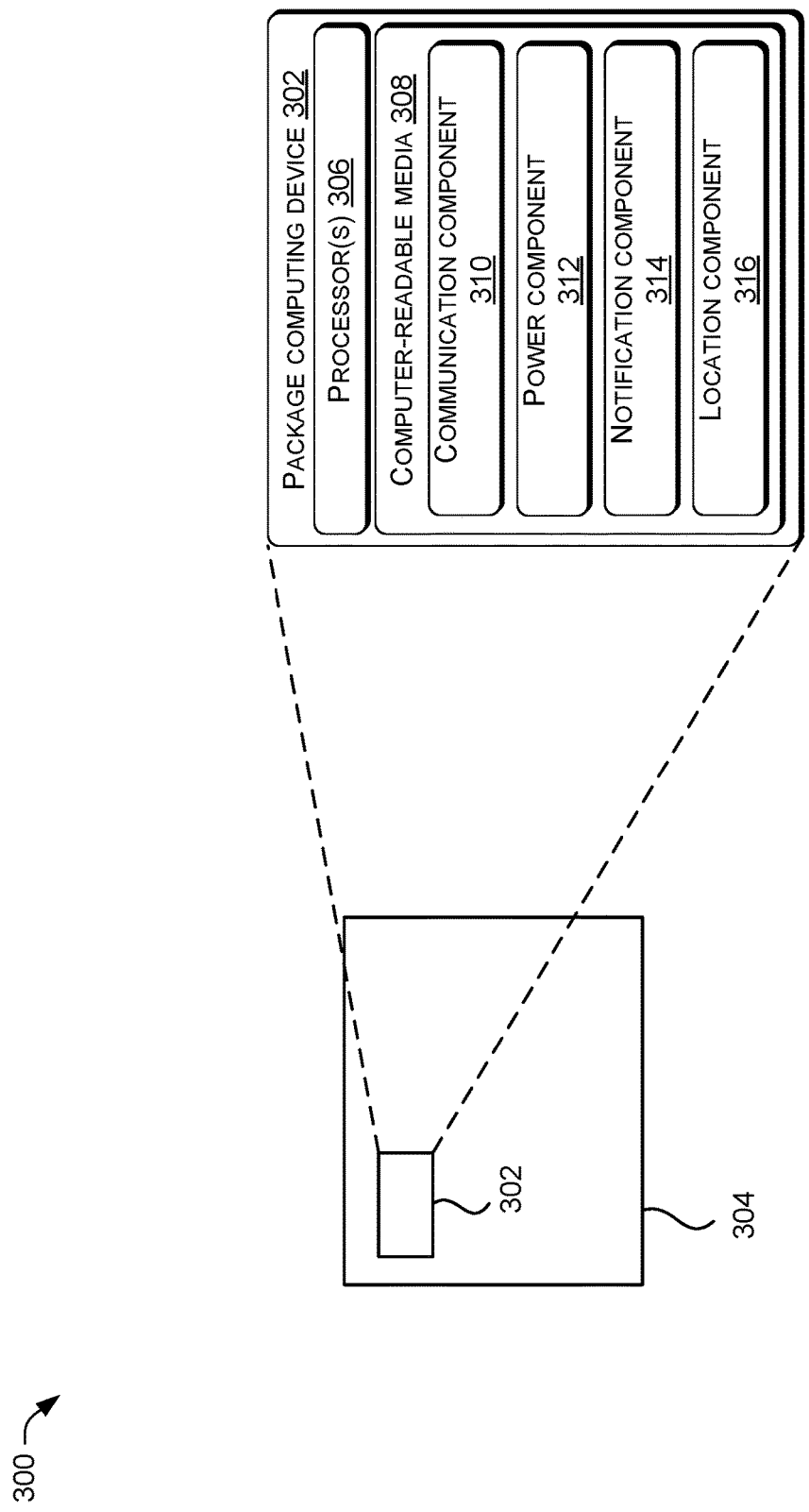
FIG. 3 is a system diagram of an illustrative computing architecture of the package computing device of FIGS. 2A-2F.

FIG. 3 is an illustrative computer architecture diagram 300 of a package computing device 302. The package computing device 302 can be similar to the package computing device 210 depicted in FIGS. 2A-2F. The package computing device 302 can be attached (e.g., affixed to an exterior) to or attached to an interior surface of a package 304, which can be similar to the package 108 depicted in FIG. 1 and the package 202 depicted in FIGS. 2A-2F. In some instances, the package computing device 302 can be placed within the package 304.

The package computing device 302 can be implemented in a distributed or non-distributed computing environment. For example, some of the components can be distributed across multiple computing platforms or all of the components can be consolidated onto a single computing platform. Additionally, some of the components can be duplicated and implemented in parallel.

The package computing device 302 can include processor(s) 306 and a computer-readable media 308 that stores various modules, applications, programs, or other data. In some instances, the processor(s) 306 can include a central processing unit (CPU), a graphics processing unit (GPU), both a CPU and a GPU, or other processing units or components known in the art. Additionally, each of the processor(s) 306 can possess its own local memory, which also may store program modules, program data, and/or one or more operating systems. The computer-readable media 308 can also include instructions, that when executed by the processor(s) 306, cause the processor(s) 306 to perform the operations described herein for the package computing device 302.

The computer-readable media 308 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 308 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 308 can store a communication component 310, a power component 312, a notification component 314, and a location component 316. The communication component 310 can enable the package computing device 302 to receive data from the delivery computing device that can include the identifier of the package computing device 302 and instructions to initiate a notification protocol. As discussed above, the identifier can be a UUID, a MAC address, a different identifier, and/or a generated value. In some instances, the communication component 310 can communicate using RFID, Wi-Fi, and/or Bluetooth, although other wireless communication standards are contemplated, such as cellular-based communications. For example, the package computing device 302 can be configured to communicate, using the communication component 310, with the remote computing system. By way of example and without limitation, the package computing device 302 can receive instructions to initiate the notification protocol from the remote computing system rather than receiving the instructions from the delivery computing device.

The power component 312 can include a power source such as a battery of the package computing device 302. The battery of the power component 312 can provide power to allow the package computing device 302 to communicate as well as initiate the notification protocol. In some instances, the power component 312 can include other sources of power such as solar cells and/or a dynamo.

The notification component 314 can include one or more components such as a light (e.g., a light-emitting diode), a speaker, and/or a vibration motor. For example, the notification instructions received via the communication component 310 can instruct the notification component 314 to activate a light and/or produce a flashing light pattern. As discussed above the notification instructions can be transmitted to the package computing device 302 by a delivery computing device and/or a processing system (e.g., a remote computing system). The light can be visible light, infrared light, and the like. In some instances, the notification component 314 can activate a speaker to produce a sound and/or a sound pattern. The sound can be within the human hearing range (e.g., 20 Hz to 20 kHz), and/or outside of the human hearing range (e.g., ultrasonic or subsonic frequencies). In some instances, the notification component 314 can activate a vibration motor and/or a vibration pattern. By way of example and without limitation, the package computing device 302 can include a motor that is attached to a rotating mass that causes the package computing device 302 to vibrate when the mass rotates. The light, the sound, and/or the vibration can be based on the notification instructions received from the delivery computing device and/or the remote computing system.

The use of the package computing device 302 can allow for the package 304 to be locatable by a courier that is transporting/delivering the package by providing an auditory, visual, and/or physical indication of the location of the package 304.

Figure 4:
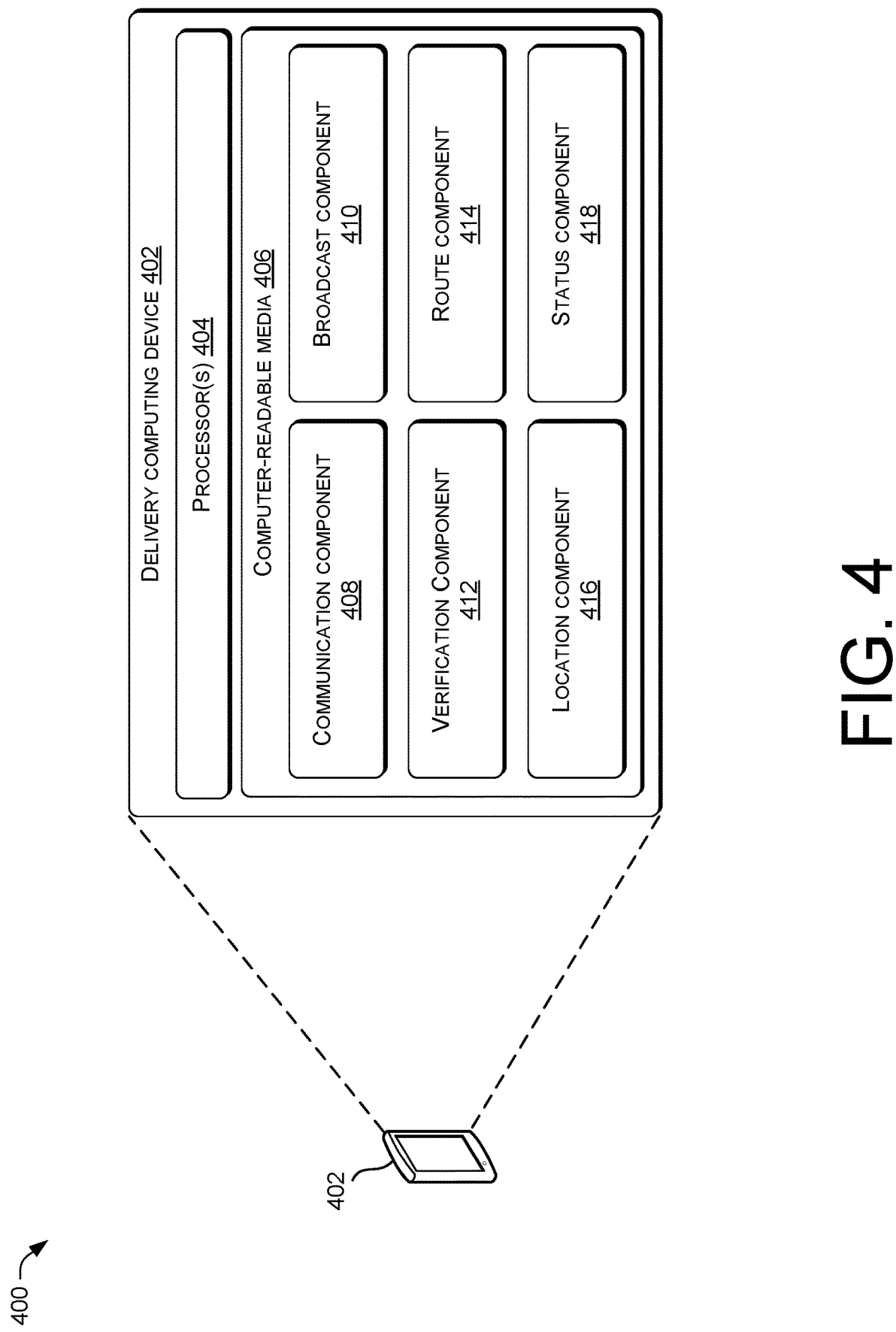
FIG. 4 is a system diagram of an illustrative computing architecture of a delivery confirmation system.

FIG. 4 is an illustrative computer architecture 400 of a delivery computing device (also referred to as a delivery device) 402. The delivery computing device4 402 can be similar to the delivery computing device 104 depicted in FIG. 1.

The delivery computing device 402 can be implemented in a distributed or non-distributed computing environment.

For example, some of the components can be distributed across multiple computing platforms or all of the components can be consolidated onto a single computing platform. Additionally, some of the components can be duplicated and implemented in parallel.

The delivery computing device 402 can include processor(s) 404 and a computer-readable media 406 that stores various modules, applications, programs, or other data. In some instances, the processor(s) 404 can be similar to processor(s) 306 and the computer-readable media 406 can be similar to the computer-readable media 306 depicted in FIG. 3. While depicted as a mobile device similar to a cellphone, the delivery computing device 402 can, in some instances, be a tablet computer, a laptop computer, a smartwatch, and/or a different wearable device.

The computer-readable media 406 can store a communication component 408, a broadcast component 410, a verification component 412, a route component 414, a location component 416, and a status component 418.

The communication component 408 can allow the delivery computing device 402 to receive the identifier from a processing system (e.g., a remote computing system). As discussed above, the delivery computing device 402 can be at a processing center (e.g., a sortation center, a distribution center, a fulfillment center, etc.) and the processing system can transmit data to the delivery computing device 402 that includes one or more identifiers associated with one or more packages that are loaded onto a delivery vehicle. In some instances, the delivery computing device 402 can receive, from the processing system package data that can indicate at least one of a size of the package, a shape of the package, a color of the package, a package type (e.g., a box, a bag, and the like). The package data can be used to describe the package to the courier to assist the courier in locating the package within, for example, a cargo portion of a delivery vehicle.

The delivery computing device 402 can then use the broadcast component 410 to broadcast data such as a verification request that includes the one or more identifiers. In some instances, the broadcast component 410 can include using wireless communications such as Wi-Fi, Bluetooth and/or RFID. Then, the one or more package computing devices that are associated with the one or more packages that are within communication range of the delivery computing device 402 can respond to the broadcast data.

Based on the response, the verification component 412 can compare the one or more identifiers with the response (e.g., the verification response) from the one or more package computing devices to determine whether the delivery vehicle is loaded with the correct packages (e.g., packages intended for a delivery route of the delivery vehicle).

In some instances, the delivery computing device 402 can receive, via the communication component 408 and from a processing system, a delivery address and/or map data. Based on the delivery address and/or the map data, the route component 414 can determine a delivery route to deliver the package to the delivery location.

The location component 416 can be used to determine a location associated with the delivery computing device. For example, the location component 416 can determine a location of the delivery computing device from location data of a GPS receiver although other types of systems are contemplated for determining the location data such as cellular network data and/or triangulation of cellular network connectivity.

The location component 416 can also determine that the delivery computing device 402 is within a geographic region associated with the delivery location (e.g., within a threshold distance to the delivery location). In some instances, the location component 416 can store the map data and compare a current location of the delivery computing device 402 with the map data and determine that the delivery computing device is within the geographic region associated with the delivery location. In some instances, the location component 416 can access map data using the communication component 408 from a remote computing system.

As discussed above, the location of the delivery computing device 402 being within a threshold distance to the delivery location can be a precondition of the delivery computing device 402 using the broadcast component 410 to transmit data including an identifier associated with the package computing device associated with the package and instructions to initiate a notification protocol.

The status component 418 can determine a status of the delivery vehicle which can be associated with an additional precondition. For example, the status can indicate that the delivery vehicle is traveling at a velocity below a velocity threshold and/or traveling at a velocity below a velocity threshold for a threshold amount of time which can be associated with the courier preparing to perform a delivery. In some instances, the status can indicate that the delivery vehicle shifted into a "park" mode (e.g., shifting the transmission into park") which can indicate that the courier is preparing to perform a delivery. In some instances, the status can indicate that the delivery vehicle engaged a parking brake. In some instances, turning off an ignition of the delivery vehicle can indicate that the courier is preparing to perform a delivery. As discussed above, an individual or a combination of preconditions can be required for the delivery computing device 402 to broadcast the data comprising the identifier and the instructions to initiate the notification protocol.

Figure 5:
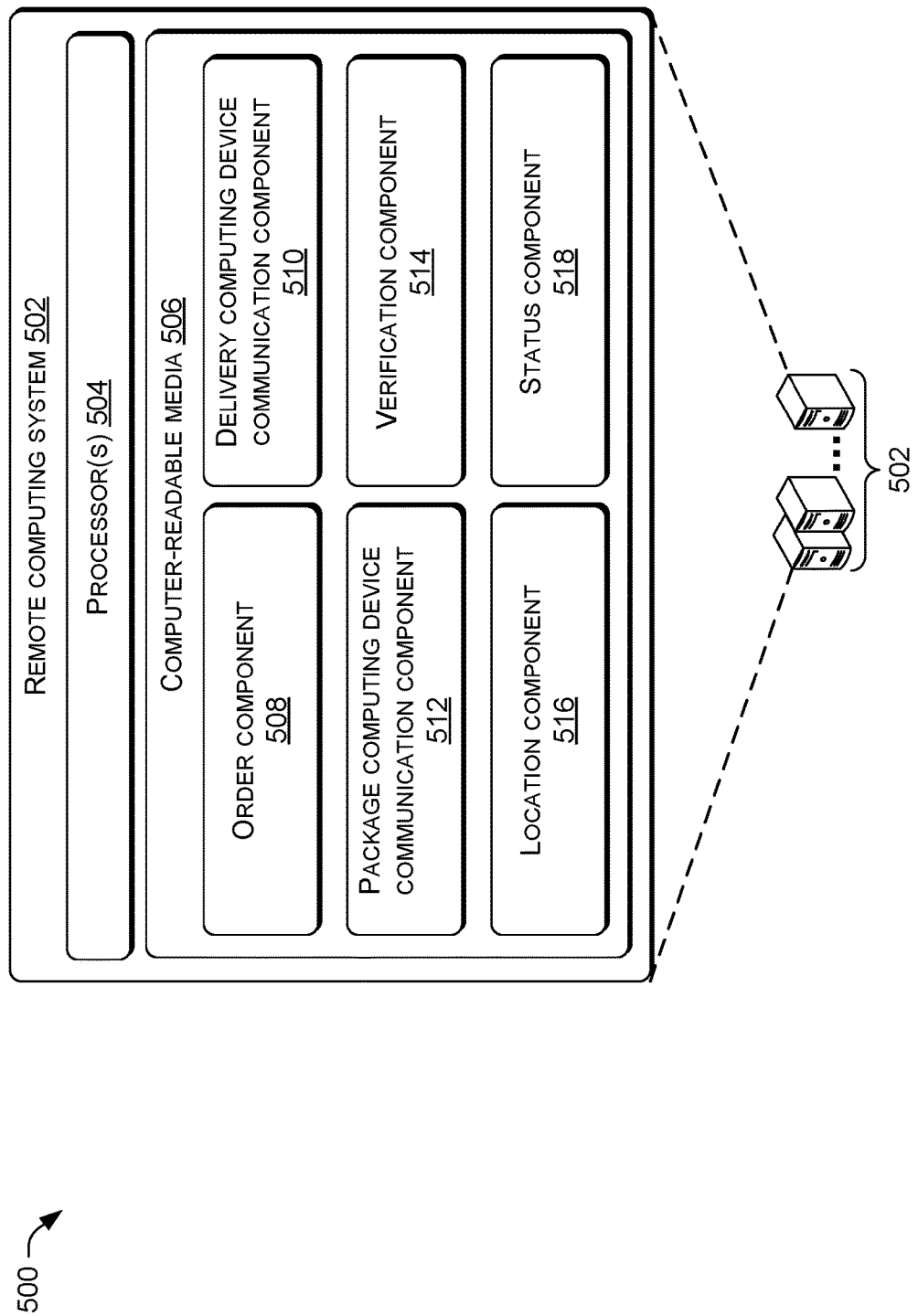
FIG. 5 is a system diagram of an illustrative computing architecture of a delivery computing device.

FIG. 5 is an illustrative computer architecture 500 of a remote computing system (also referred to as a processing system) 502. The remote computing system 502 can be similar to the remote computing system 110 depicted in FIG. 1.

The remote computing system 502 can be implemented in a distributed or non-distributed computing environment. For example, some of the components can be distributed across multiple computing platforms or all of the components can be consolidated onto a single computing platform. Additionally, some of the components can be duplicated and implemented in parallel.

The remote computing system 502 can include processor(s) 504 and a computer-readable media 506 that stores various modules, applications, programs, or other data. In some instances, the processor(s) 504 can include a central processing unit (CPU), a graphics processing unit (GPU), both a CPU and a GPU, or other processing units or components known in the art. Additionally, each of the processor(s) 506 can possess its own local memory, which also may store program modules, program data, and/or one or more operating systems. The computer-readable media 506 can also include instructions, that when executed by the processor(s) 504, cause the processor(s) 504 to perform the operations described herein for the remote computing system 502.

The computer-readable media 506 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 506 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 506 can store an order component 508, a delivery computing device communication component 510, a package computing device communication component 512, a verification component 514, a location component 516, and a status component 518.

The order component 508 can determine that a user has ordered and/or purchased an item that is to be delivered to a delivery location of the user (e.g., a residence, a workplace, etc.). In some instances, the order component 508 can determine order data (and/or purchase data) that can indicate, for example, the item ordered/purchased, a cost of the time, the delivery location, and/or a delivery preference associated with the order/purchase and/or the user. The order component 508 can determine a package associated with the order and associate a package computing device with the order. For example, the order component 508 can scan a code such as a QR code, a UPC, and the like. In some instances, the order component 508 can use radio-frequency identification (RFID) to determine the identifier of the package computing device. Then, the processing system can associate the identifier and the package computing device with the order. The order component 508 may store an association between the package computing device and the package/item in a database or datastore maintained by, associated with, or otherwise accessible by the remote computing system 502.

The delivery computing device communication component 510 can be used to communicate with the delivery computing device used by a courier to deliver the package to the delivery location. As discussed above, in some instances, the delivery computing device can be associated with a delivery vehicle (e.g., the delivery computing device can be a component of the delivery vehicle). For example, the delivery computing device communication component 510 can use types of wireless communications such as RFID, Wi-Fi, Bluetooth, and/or cellular data connections to communicate with the delivery computing device.

The package computing device communication component 512 can similarly be used to communicate with the package computing device that is associated with the package. For example, the package device communication component 512 can use types of wireless communications such as RFID, Wi-Fi, Bluetooth, and/or cellular data connections to communicate with the package computing device.

In some instances, the remote computing system 502 can communicate with the delivery computing device using the delivery computing device communication component 510 to verify a payload of the delivery vehicle before the delivery vehicle leaves from a processing center. As discussed above, the remote computing system 502 can transmit one or more identifiers associated with a delivery route of the delivery vehicle and receive a response indicating the identifiers of the one or more package computing devices that are within a communication range of the delivery computing device. Based on the response, the verification component 514 can compare the one or more identifiers with the response from the one or more package computing devices to determine whether the delivery vehicle is loaded with the correct packages (e.g., packages intended for a delivery route of the delivery vehicle).

The location component 516 can also communicate with the delivery computing device and/or the package computing device to receive location data and determine that the delivery computing device and/or the package computing device is within a geographic region associated with the delivery location (e.g., within a threshold distance to the delivery location). In some instances, the location component 516 can store the map data and compare a current location of the delivery computing device and/or the package computing device with the map data and determine that the delivery computing device and/or the package computing device is within the geographic region associated with the delivery location.

As discussed above, the location of the delivery computing device and/or the package computing device being within a threshold distance to the delivery location can be a precondition of the delivery computing device broadcasting data including an identifier associated with the package computing device associated with the package and instructions to initiate a notification protocol. In some instances, the remote computing system 502 can communicate directly with the package computing device to transmit instructions to initiate the notification protocol.

The status component 518 can determine a status of the delivery vehicle which can be associated with an additional precondition. For example, the remote computing system 502 can receive status data from the delivery computing device and/or the delivery vehicle where the status can indicate that the delivery vehicle is traveling at a velocity below a velocity threshold and/or traveling at a velocity below a velocity threshold for a threshold amount of time which can be associated with the courier preparing to perform a delivery. In some instances, the status can indicate that the delivery vehicle shifted into a "park" mode (e.g., shifting the transmission into park") which can indicate that the courier is preparing to perform a delivery. In some instances, the status can indicate that the delivery vehicle engaged a parking brake. In some instances, turning off an ignition of the delivery vehicle can indicate that the courier is preparing to perform a delivery. As discussed above, an individual or a combination of preconditions can be required for the delivery computing device to broadcast the data comprising the identifier and the instructions to initiate the notification protocol or for the remote computing system 502 to transmit the instructions to the package computing device to initiate the notification protocol.

Figure 6:
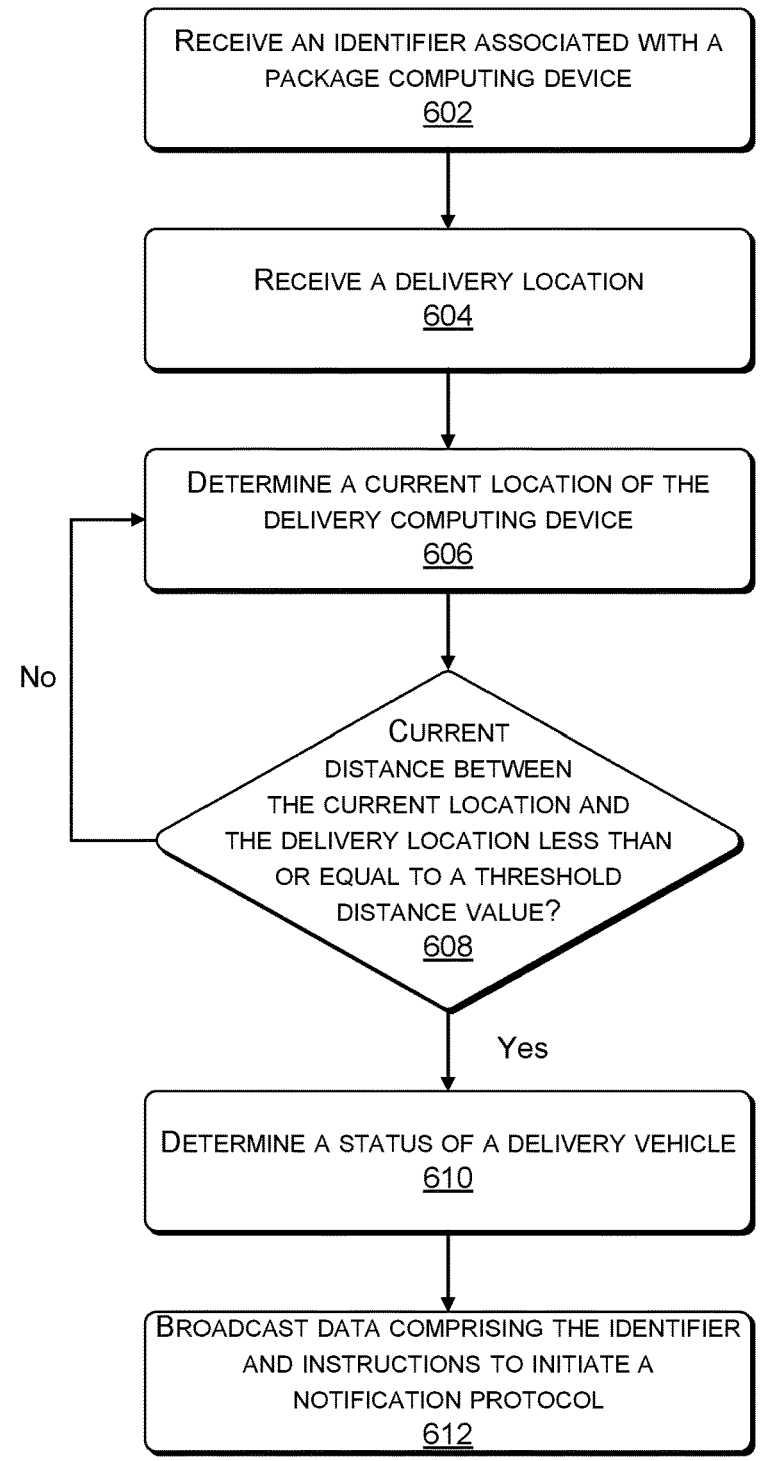
FIG. 6 is a flow diagram of an example process for broadcasting, from a delivery device, an identifier associated with a package computing device and instructions to initiate a notification protocol.

FIG. 6 is a flow diagram of an example process 600 for broadcasting data comprising an identifier associated with a package computing device and instructions to initiate a notification protocol. The example process 600 can be performed in other similar and/or different environments. Additionally, some portions of example process 600 can be omitted, replaced, and/or reordered while still providing the functionality of broadcasting data comprising the identifier and instructions to initiate the notification protocol.

At operation 602, the delivery computing device can receive an identifier associated with a package computing device. The delivery computing device can receive the identifier from a remote computing system such as a processing system. In some instances, the delivery computing device can receive the identifier using wireless communications such as RFID, Wi-Fi, Bluetooth, and/or cellular data connections.

At operation 604, the delivery computing device can receive a delivery location that is associated with a package for delivery. As discussed above, the delivery computing device can receive the delivery location from the remote computing system. In some instances, the delivery computing device can receive a delivery route that a delivery vehicle can follow to deliver the package. In some instances, the delivery computing device can receive map data that includes the delivery location.

At operation 606, the delivery computing device can use a location component to determine a location associated with the delivery computing device. In some instances, the location component can use GPS data from a GPS receiver to determine the location of the delivery computing device. In some instances, the location component can use cellular network data and/or other sensor data to determine the location of the delivery computing device.

At operation 608, the location component of the delivery computing device can perform a check to determine if the delivery computing device has entered a geographic region associated with a delivery location (e.g., is within a distance threshold of the delivery location). The geographic region can be, for example, a region defined by a radius around the delivery location. In some instances, the location component can access the map data and use the location of the delivery computing device and the map data to determine if the delivery computing device has entered the geographic region. If the delivery computing device has not entered the geographic region, then the example process 600 can return to operation 606. If the delivery computing device has entered the geographic region, then the example process 600 can proceed to operation 610.

At operation 610, the delivery computing device can determine a status of the delivery vehicle. For example, the status can indicate that the delivery vehicle is traveling at a velocity below a velocity threshold and/or traveling at a velocity below a velocity threshold for a threshold amount of time which can be associated with the courier preparing to perform a delivery. In some instances, the status can indicate that the delivery vehicle shifted into a "park" mode (e.g., shifting the transmission into park") which can indicate that the courier is preparing to perform a delivery. In some instances, the status can indicate that the delivery vehicle engaged a parking brake. In some instances, turning off an ignition of the delivery vehicle can indicate that the courier is preparing to perform a delivery.

At operation 612, the delivery computing device can then use broadcast component to broadcast data that includes the identifier of the package computing device associated with the delivery location. For example, based on the status indicating that the delivery vehicle is prepared for a delivery, the broadcast component can broadcast the identifier include using wireless communications such as Wi-Fi, Bluetooth and/or RFID and broadcast the instructions to initiate the notification protocol. Then, the package computing device that is associated with the delivery location can initiate the notification protocol to assist the courier in locating the package.

Figure 7:
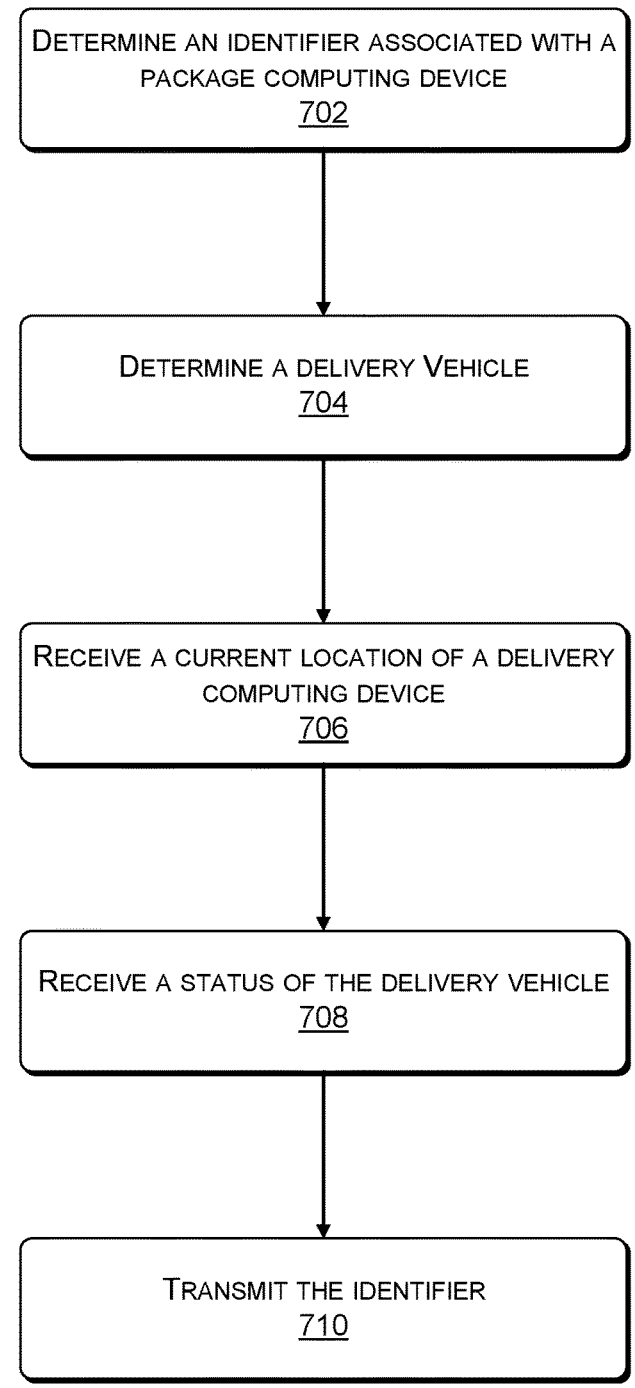
FIG. 7 is a flow diagram of an example process for transmitting an identifier associated with a package computing device to a delivery computing device.

FIG. 7 is a flow diagram of an example process 700 for transmitting an identifier associated with a package computing device. The example process 700 can be performed in other similar and/or different environments. Additionally, some portions of example process 700 can be omitted, replaced, and/or reordered while still providing the functionality of transmitting the identifier associated with the package computing device.

At operation 702, the remote computing system can determine an identifier associated with a package computing device. For example, an order component can scan a code such as a QR code, a UPC, and the like. In some instances, the order component can use RFID to determine the identifier of the package computing device. Then, the processing system can associate the identifier and the package computing device with the order. The order component can store an association between the package computing device and the package/item in a database or datastore maintained by, associated with, or otherwise accessible by the remote computing system.

At operation 704, the remote computing system can determine a delivery vehicle associated with the order. For example, a processing center, such as a sortation center, a distribution center, and/or a fulfillment center) can use one or more personnel, conveyors, robots, etc. to load the package onto the delivery vehicle associated with the delivery of the package. The remote computing system can determine the delivery vehicle associated with the delivery before the package is loaded onto the delivery vehicle and direct the one or more personnel, conveyors, robots, etc. to load the package onto the correct delivery vehicle.

At operation 706, the delivery vehicle can begin the delivery of the package and the remote computing system can communicate with the delivery computing device to receive location data indicating the location of the delivery vehicle and/or the delivery computing device. A location component can determine that the delivery computing device and/or the package computing device is within a geographic region associated with the delivery location (e.g., within a threshold distance to the delivery location). In some instances, the location component can store the map data and compare a current location of the delivery computing device and/or the package computing device with the map data and determine that the delivery computing device and/or the package computing device is within the geographic region associated with the delivery location.

At operation 708, a status component can determine a status of the delivery vehicle. For example, the remote computing system can receive status data from the delivery computing device and/or the delivery vehicle where the status can indicate that the delivery vehicle is traveling at a velocity below a velocity threshold and/or traveling at a velocity below a velocity threshold for a threshold amount of time which can be associated with the courier preparing to perform a delivery. In some instances, the status can indicate that the delivery vehicle shifted into a "park" mode (e.g., shifting the transmission into park") which can indicate that the courier is preparing to perform a delivery. In some instances, the status can indicate that the delivery vehicle engaged a parking brake. In some instances, turning off an ignition of the delivery vehicle can indicate that the courier is preparing to perform a delivery. As discussed above, an individual or a combination of preconditions can be required for the remote computing system to transmit the instructions to the delivery computing device and/or package computing device to initiate the notification protocol.

At operation 710, the delivery computing device communication component and/or the package computing device communication component can transmit the identifier to the delivery computing device and/or the package computing device to initiate and/or cause the initiation of the notification protocol of the package computing device.

Figure 8:
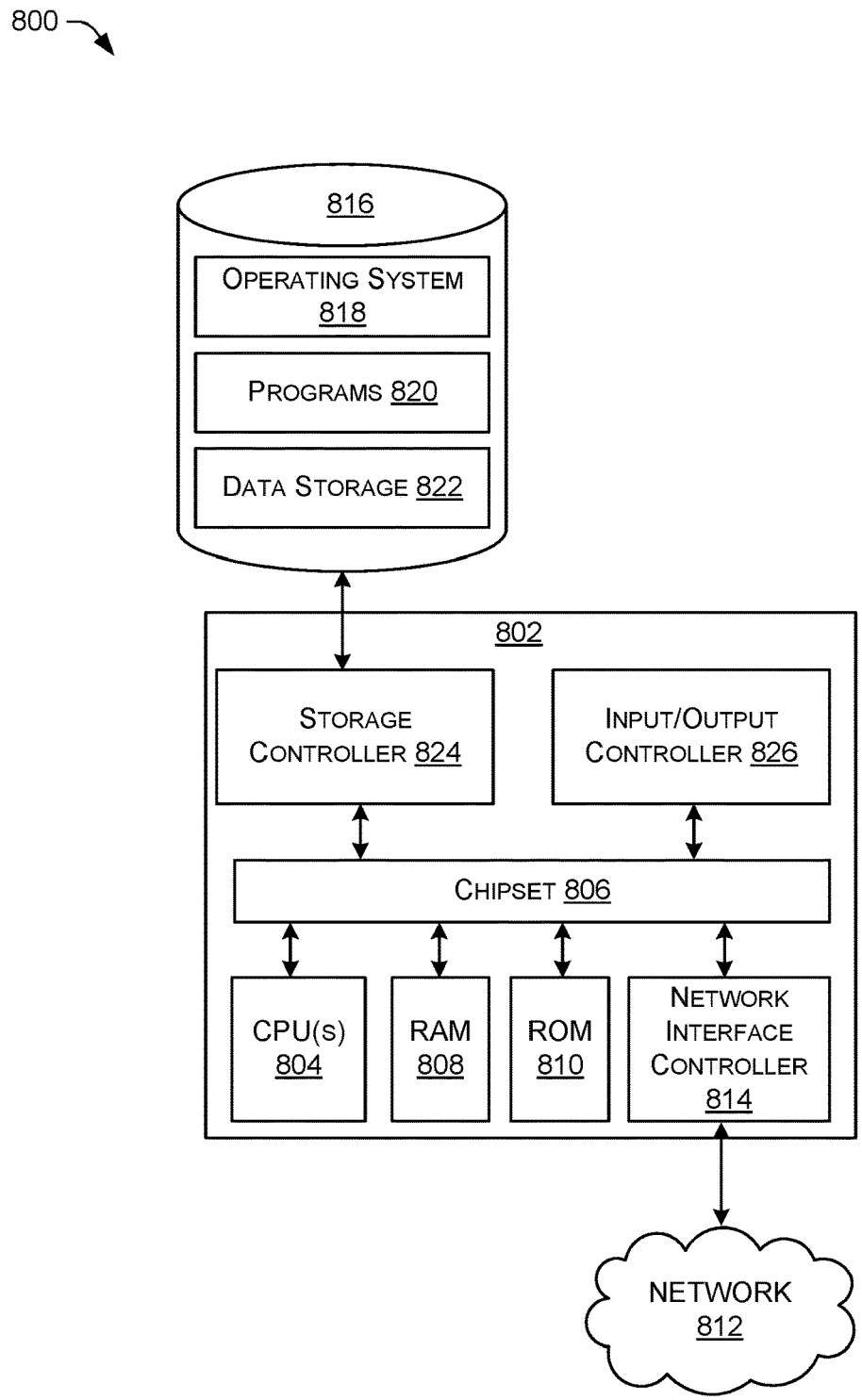
FIG. 8 is a computer architecture diagram showing an illustrative computer hardware architecture for implementing a computing device that can be utilized to implement aspects of the various technologies presented herein.

FIG. 8 is an example computer architecture for a computer 800 capable of executing program components for implementing the functionality described above. The computer architecture shown in FIG. 8 illustrates a conventional server computer, workstation, desktop computer, laptop computer, tablet, network appliance, eBook reader device, smartphone, smart speaker, smart display, television, wearable device (e.g., a watch, an activity tracker, smart glasses, etc.), or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing systems and computer systems through a network, such as the network 812. The chipset 806 can include functionality for providing network connectivity through a network interface controller (NIC) 814, such as a gigabit Ethernet adapter. The NIC 814 is capable of connecting the computer 800 to other computing devices over the network 812. It should be appreciated that more than one NIC 814 can be present in the computer 800, connecting the computer to other types of networks and remote computer systems.

The computer 800 can be connected to a mass storage device 816 that provides non-volatile storage for the computer. The mass storage device 816 can store an operating system 818, programs 820, and data storage 822, which have been described in greater detail herein. The mass storage device 816 can be connected to the computer 800 through a storage controller 824 connected to the chipset 806. The mass storage device 816 can consist of one or more physical storage units. The storage controller 824 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 816 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 816 is characterized as primary or secondary storage, and the like.

For example, the computer 800 can store information to the mass storage device 816 by issuing instructions through the storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 816 by detecting the physical states or characteristics of one or more particular locations within the physical storage units.

In addition to the mass storage device 816 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 816 can store an operating system 818 utilized to control the operation of the computer 800. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 816 can store other system or application programs and data utilized by the computer 800.

In one configuration, the mass storage device 816 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above. The computer 800 can also include computer-readable storage media for performing any of the other computer-implemented operations described herein.

The computer 800 can also include one or more input/output controllers 826 for receiving and processing input from a number of input devices, such as a keyboard, a mouse, a touchpad, a touch screen, an electronic stylus, or other type of input device. Similarly, one of the one or more input/output controllers 826 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A delivery computing device comprising:
   one or more processors; and
   one or more computer-readable media storing computer-executable instructions that, when executed, cause the delivery computing device to perform operations comprising:
      receiving, from a remote computing system, an identifier that is associated with a package computing device, the package computing device removably coupled to a package for delivery to a delivery location;
      receiving, from the remote computing system, the delivery location;
      determining a current location of the delivery computing device;
      determining that a current distance between the current location and the delivery location is less than or equal to a threshold distance value;
      determining a status of a delivery vehicle associated with the delivery to the delivery location, the status indicating one of an ignition-off status or a parked status; and
      broadcasting, based on the current distance being less than or equal to the threshold distance value and the status, broadcast data comprising the identifier and instructions to initiate a notification protocol that comprises at least one of:
         causing activation of a light of the package computing device;
         causing output of audio via a speaker of the package computing device; or
         causing activation of a vibration motor of the package computing device.

2. The delivery computing device as recited in claim 1, the operations further comprising:
   receiving, from the package computing device, response data indicating that the notification protocol has been disabled; and
   transmitting, to the remote computing system, the response data.

3. The delivery computing device as recited in claim 1, the operations further comprising:
   receiving, from the remote computing system, a delivery manifest that lists the identifier;
   broadcasting, based on the delivery manifest, a verification request to determine that the package computing device is within a communication range of the delivery computing device; and
   receiving, from the package computing device, a verification response indicating that the package computing device is within the communication range of the delivery computing device.

4. The delivery computing device as recited in claim 1, the operations further comprising:
   receiving, from the remote computing system, a delivery manifest that lists one or more identifiers, wherein the identifier is one of the one or more identifiers;
   determining, based on the delivery manifest, a delivery route of the delivery vehicle;
   broadcasting a verification request;
   receiving, from one or more package computing devices, one or more verification responses indicating that at least one of the one or more package computing devices is within a communication range of the delivery computing device, wherein the package computing device is one of the one or more package computing devices;
   determining, based on the one or more identifiers and the one or more verification responses, at least one of:
      an individual package computing device of the one or more package computing devices that is unassociated with the delivery route; or
      an individual identifier of the one or more identifiers that is unassociated with one of the one or more verification responses; and
   determining, based on the individual package computing device or the individual identifier, a payload error associated with the delivery vehicle.

5. A method comprising:
   determining a current location of a delivery computing device;
   transmitting, to a remote computing system, the current location;
   determining a status of a delivery vehicle associated with a delivery of a package to a delivery location;
   transmitting, to the remote computing system, the status;
   receiving, from the remote computing system and based at least in part on the current location and the status, an identifier of a package computing device that is associated with the package; and sending, based at least in part on receiving the identifier, instruction data instructing the package computing device to initiate a notification protocol that comprises at least one of:
- causing activation of a light of the package computing device;
- causing audio data to be output via a speaker of the package computing device; or
- causing activation of a vibration motor of the package computing device.

6. The method as recited in claim 5, wherein the status indicates at least one of:
- an ignition-off status indicating that an ignition of the delivery vehicle is turned off; or
- a parked status indicating that one of a transmission or a braking system of the delivery vehicle is in a parked position.

7. The method of claim 5, further comprising:
- determining a current distance between the current location and the delivery location; and
- determining that the current distance is less than or equal to a threshold distance value indicating that the delivery computing device is within a delivery region of the delivery location;
- wherein receiving the identifier is further based at least in part on the delivery computing device being within the delivery region.

8. The method of claim 5, further comprising:
- receiving, from the package computing device, response data indicating that the notification protocol has been disabled; and
- transmitting, to the remote computing system, the response data indicating that the notification protocol has been disabled.

9. The method of claim 5, further comprising:
- receiving, from the remote computing system, a delivery manifest that lists the identifier;
- broadcasting, based at least in part on the delivery manifest, a verification request to determine that the package computing device is within a communication range of the delivery computing device; and
- receiving, from the package computing device, a verification response indicating that the package computing device is within the communication range of the delivery computing device.

10. The method of claim 5, further comprising:
- receiving, from the remote computing system, a delivery manifest that lists one or more identifiers, wherein the identifier is one of the one or more identifiers;
- determining, based at least in part on the delivery manifest, a delivery route associated with the delivery vehicle;
- broadcasting a verification request;
- receiving, from one or more package computing devices, one or more verification responses, wherein the package computing device is one of the one or more package computing devices;
- determining, based at least in part on the one or more identifiers and the one or more verification responses, at least one of:
  - an individual package computing device of the one or more package computing devices that is unassociated with the delivery route; or
  - an individual identifier of the one or more identifiers that is unassociated with one of the one or more verification responses; and
- based at least in part on the individual package computing device or the individual identifier, a payload error associated with the delivery vehicle.

11. The method as recited in claim 5, wherein the package computing device is removably coupled to the package using one of:
- an enclosure that is adhered to the package, wherein the package computing device is placed within the enclosure;
- a perforated portion of the package, wherein the package computing device is attached to the perforated portion; or
- a band placed around the package, wherein the package computing device is attached to the band.

12. The method of claim 5, further comprising:
- receiving, from the remote computing system, package data indicating at least one of a size or a shape of the package.

13. A non-transitory computer-readable medium storing instructions executable by a processor, wherein the instructions, when executed, cause the processor to perform operations comprising:
- determining an identifier of a package computing device associated with a package for delivery to a delivery location, the package computing device comprising at least one of a light, a speaker, or a vibration motor;
- determining a delivery vehicle associated with the delivery;
- receiving, from a delivery computing device associated with the delivery vehicle, a current location of the delivery computing device;
- receiving, from the delivery computing device, a status of the delivery vehicle; and
- transmitting, to the delivery computing device and based at least in part on the current location and the status, the identifier.

14. The non-transitory computer-readable medium of claim 13, wherein transmitting the identifier is further based at least in part on determining that current distance between the current location and the delivery location is less than or equal to a threshold distance value.

15. The non-transitory computer-readable medium of claim 13, the operations further comprising:
- receiving, from the delivery computing device and based at least in part on transmitting the identifier, a verification response indicating that the package computing device is within a communication range of the delivery computing device;
- determining, based at least in part on the verification response, that a payload of the delivery vehicle comprises the package; and
- determining, based at least in part on the payload of the delivery vehicle comprising the package, that the payload of the delivery vehicle is verified.

16. The non-transitory computer-readable medium of claim 15, the operations further comprising:
- transmitting, to the delivery computing device, instruction data indicating that the payload is verified,
- wherein a departure of the delivery vehicle from a fulfillment center at which packages are placed within delivery vehicles is based at least in part on the instruction data indicating that the payload is verified.

17. The non-transitory computer-readable medium of claim 13, wherein the package computing device is a first package computing device, the operations further comprising:

receiving, from the delivery computing device and based at least in part on transmitting the identifier, a verification response indicating that a second package computing device is within a communication range of the delivery computing device; and determining, based at least in part on the verification response, an unverified payload associated with the delivery vehicle.

18. The non-transitory computer-readable medium of claim 17, the operations further comprising:

transmitting, to the delivery computing device, instruction data indicating the unverified payload; and preventing, based at least in part on the unverified payload, a departure of the delivery vehicle from a fulfillment center.

19. The non-transitory computer-readable medium of claim 13, wherein the package computing device is removably coupled to the package using one of:

an enclosure that is adhered to the package, wherein the package computing device is placed within the enclosure;

a perforated portion of the package, wherein the package computing device is attached to the perforated portion; or a band placed around the package, wherein the package computing device is attached to the band.

20. The non-transitory computer-readable medium of claim 13, the operations further comprising:

transmitting, to the delivery computing device, package data indicating at least one of a size or a shape of the package.

* * * * *